(12) United States Patent
Naffziger et al.

(10) Patent No.: US 9,483,092 B2
(45) Date of Patent: Nov. 1, 2016

(54) PERFORMANCE STATE BOOST FOR MULTI-CORE INTEGRATED CIRCUIT

(71) Applicant: Advanced Micro Devices, Inc., Sunnyvale, CA (US)

(72) Inventors: Samuel Naffziger, Fort Collins, CO (US); Baomin Liu, Austin, TX (US); Maxat Touzelbaev, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 285 days.

(21) Appl. No.: 14/053,315

(22) Filed: Oct. 14, 2013

(65) Prior Publication Data

US 2015/0106642 A1     Apr. 16, 2015

(51) Int. Cl.
*G06F 1/26* (2006.01)
*G06F 1/32* (2006.01)

(52) U.S. Cl.
CPC .............. *G06F 1/26* (2013.01); *G06F 1/3206* (2013.01)

(58) Field of Classification Search
CPC ........ G06F 1/26; G06F 1/206; G06F 1/3206; G06F 1/324; G06F 1/3296; G06F 11/3058; G06F 11/3062; Y02B 60/1275
See application file for complete search history.

(56) References Cited

U.S. PATENT DOCUMENTS

| | | | |
|---|---|---|---|
| 6,889,332 B2 | 5/2005 | Helms et al. | |
| 6,895,520 B1 | 5/2005 | Altmejd et al. | |
| 2008/0189071 A1* | 8/2008 | Aguilar | G01K 1/022 702/130 |
| 2009/0235108 A1* | 9/2009 | Gold | G06F 1/206 713/500 |
| 2010/0115304 A1* | 5/2010 | Finkelstein | G06F 1/206 713/320 |
| 2010/0324750 A1* | 12/2010 | Gaskins | G06F 1/206 700/299 |
| 2011/0301889 A1* | 12/2011 | Naffziger | G06F 1/206 702/62 |
| 2013/0246820 A1* | 9/2013 | Branover | G06F 1/3296 713/320 |
| 2014/0032010 A1* | 1/2014 | Jung | G06F 1/3206 700/299 |

OTHER PUBLICATIONS

R. Jotwani, S. Sundaram, S. Kosonocky, A. Schaefer, V. Andrade, A. Novak and S. Naffziger, "An x86-64 Core in 32 nm SOI CMOS," IEEE Journal of Solid-State Circuits, vol. 46, No. 1, pp. 162-172, Jan. 2011.

Advanced Micro Devices, Inc., "BIOS and Kernel Developer's Guide (BKDG) for AMD Family 12h Processors," Product Specification, 10 pages, 41131 Rev. 3.02, Oct. 6, 2011.

* cited by examiner

*Primary Examiner* — Dennis M Butler
(74) *Attorney, Agent, or Firm* — Polansky & Associates, P.L.L.C.; Paul J. Polansky

(57) ABSTRACT

An integrated circuit includes a multiple number of processor cores and a system management unit. The multiple number of processor cores each operate at one of a multiple number of performance states. The system management unit is coupled to the multiple number of processor cores, for setting performance states of the multiple number of processor cores. The system management unit boosts a first performance state of a first processor core of the multiple number of processor cores based on both a first temperature calculated from an estimated power consumption, and a second temperature based on a temperature measurement.

20 Claims, 6 Drawing Sheets

PERFORMANCE STATE BOOST FOR MULTI-CORE INTEGRATED CIRCUIT

FIELD

This disclosure relates generally to integrated circuits, and more specifically to integrated circuits with performance state control.

BACKGROUND

In complementary metal oxide semiconductor (CMOS) integrated circuits, power consumption is related to power supply voltage and operation frequency. In order to reduce power consumption, modern CMOS microprocessors have adopted dynamic power management using performance states. A performance state is typically a power supply voltage and clock frequency combination. An operating system (OS) determines the clock frequency to complete the current tasks and causes an on-chip system management unit to set the clock frequency accordingly. For example, if on average the microprocessor is heavily utilized, then the OS determines that the clock frequency should be increased. On the other hand if on average the microprocessor is lightly utilized, then the OS determines that the clock frequency should be decreased.

Computer systems often run application programs that require real-time execution. For correct execution of these programs, the computer system is expected to meet strict timing deadlines and to complete execution of certain tasks within constrained periods. To meet these time constraints, the OS can increase the performance state as needed. However die temperature increases at higher clock frequencies and power supply voltages, making it harder for the microprocessor to remain within specified thermal limits. Moreover, it is difficult for the integrated circuit to accurately determine how close it is to the thermal limits. Known microprocessors use thermal sensors that check die temperature and reduce the available clock frequency when the die gets too hot. However when the temperature is less than these thermal limits, it is more difficult to estimate how much the power state can be increased without reaching thermal limits. Known microprocessors measure power consumption and assume worst-care ambient temperature to determine how much the power state can be boosted. By assuming worst-case ambient temperature, the microprocessors reduce the amount of available performance increase in more typical environments.

Figure 1:
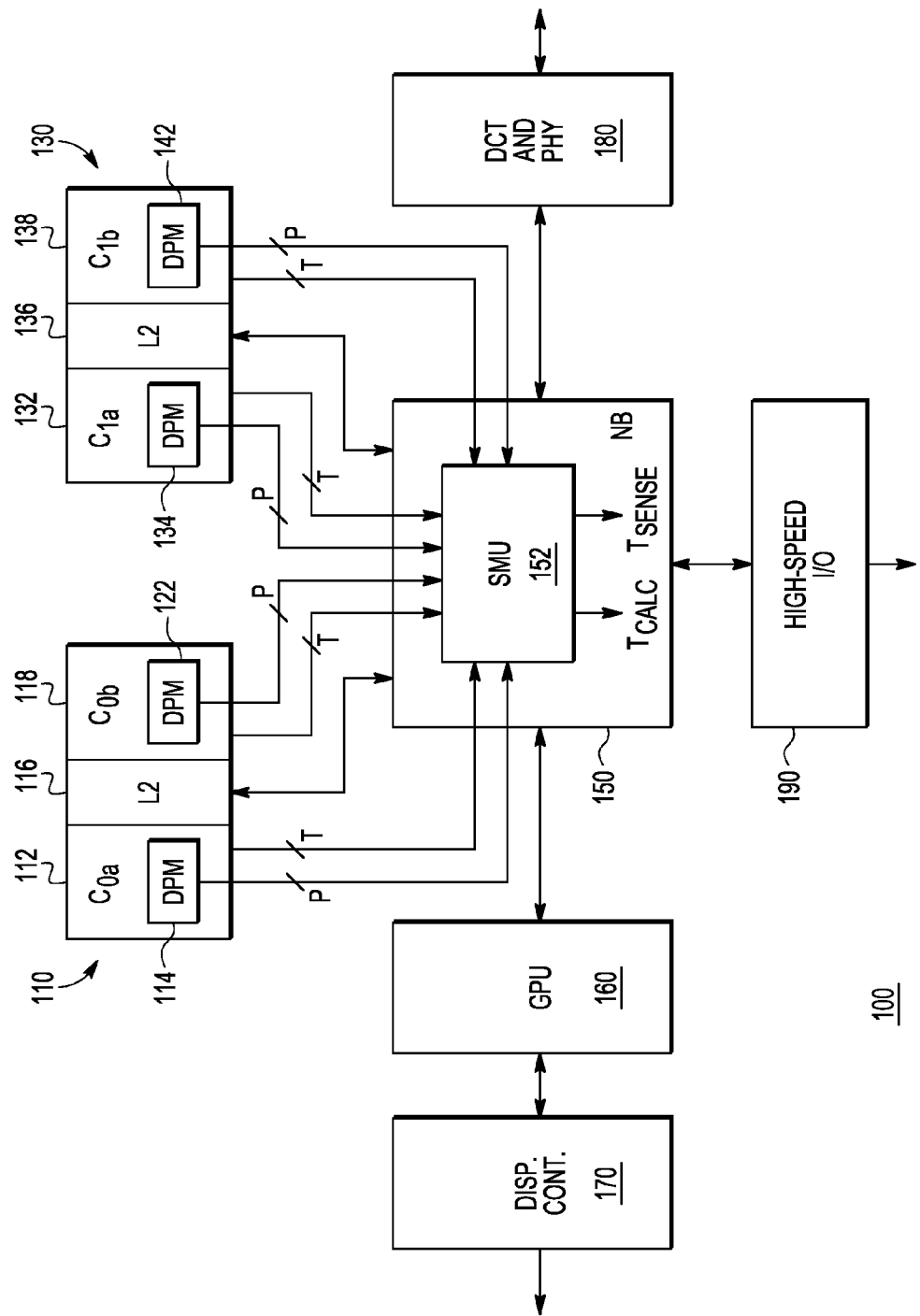
FIG. 1 illustrates in block diagram form an integrated circuit according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

An integrated circuit as disclosed below includes a multiple number of processing cores and a system management unit (SMU). The processor cores each operate at one of a multiple number of performance states. The system management unit sets performance states of the processor cores and boosts a first performance state of a first processor core using hybrid thermal sensing, which is based on both a first temperature calculated from an estimated power consumption, and a second temperature based on a temperature measurement.

In some embodiments, the system management unit boosts the performance state based on the first temperature if a system temperature is below a certain temperature. In some embodiments, each of the processor cores includes a digital power monitor responsive to activity signals to provide the estimated power consumption. In some embodiments, the first processor core includes multiple temperature sensors distributed across the first processor core, and the system management unit determines the second temperature based on temperature measurements from the temperature sensors. The first processor core could also include thermal entities corresponding to the multiple number of temperature sensors.

Thus, a system management unit as described herein determines a calculated temperature in response to an estimated power consumption, and also responds to both the calculated temperature and a sensed temperature of each of the multiple number of processor cores to determine a system temperature. The system management unit boosts a first performance state of a first processor core based on both a first temperature calculated from an estimated power consumption and a second temperature based on a temperature measurement.

FIG. 1 illustrates in block diagram form an integrated circuit 100 according to some embodiments. For the example shown in FIG. 1, integrated circuit 100 generally includes a processor core module 110, a processor core module 130, a NB 150, a processor core that is a GPU core 160, a display controller 170 labeled "DISP. CONT.", a DCT and PHY 180, and a high speed input/output (I/O) controller 190.

Processor core module 110 includes a CPU core 112 labeled "$C_{0a}$", a shared second level (L2) cache 116, and a CPU core 118 labeled "$C_{0b}$". Processor core module 130 includes a CPU core 132 labeled "$C_{1a}$", a shared L2 cache 136, and a CPU core 138 labeled "$C_{1b}$". Each one of CPU cores 112, 118, 132, and 138 includes a corresponding DPM 114, 122, 134, and 142, respectively.

Each one of CPU cores 112, 118, 132, and 138 has a set of outputs labeled "T". Each one of the corresponding DPMs 114, 122, 134, and 142 has a set of outputs labeled "P".

NB 150 includes an SMU 152. NB 150 is connected to each one of shared L2 caches 116 and 136. SMU 152 has four sets of inputs connected to each of the four sets of outputs of CPU cores 112, 118, 132, and 138, for receiving the corresponding T signals, four sets of inputs connected to each of the four sets of outputs of DPMs 114, 122, 134, and 142, for receiving the corresponding P signals, a first output for providing a signal labeled "$T_{CALC}$", and a second output for providing a signal labeled "$T_{SENSE}$".

GPU core 160 is connected to NB 150. Display controller 170 is connected to GPU 160, and has an output for connecting to a display (not shown) for providing visual data to a user. DCT and PHY 180 is connected to NB 150, where the DCT portion is connected to the PHY portion, and the PHY portion is adapted to connect to an external memory that generally includes commercially available DRAM chips such as double data rate (DDR) synchronous DRAM (SDRAM) chips (not shown). High speed I/O controller 190 is connected to NB 150, and has an output for connecting to a set of high speed peripherals (not shown).

In operation, SMU 152 sets performance states of each one of the processor cores, and also boosts a performance state of at least one of the processor cores using hybrid thermal sensing to take advantage of available temperature headroom. SMU 152 determines an accurate system temperature based on both a calculated temperature received from each one of the DPMs and a sensed temperature received from each one of the multiple temperature sensors. SMU 152 uses the system temperature to estimate the available boost performance.

CPU cores 112, 118, 132, and 138 and GPU 160 each operate at one of several available performance states, and perform a set of tasks during active periods. At least a portion of their internal circuits remain idle between the active periods. During active periods, the CPU cores fetch and execute instructions and access data associated with the instructions, and GPU core 160 performs graphics and video processing computations.

When performing instruction fetches or data accesses, a CPU core first accesses its first level L1 cache (not shown), and if the access misses the CPU core accesses the corresponding one of shared L2 caches 116 and 136, since the shared L2 cache is the next lower level of the memory hierarchy. If the access misses the L2 cache, the L2 cache provides a memory access request to NB 150. NB 150 stores access requests for dispatch to DCT and PHY 180. DCT and PHY 180 schedules memory requests and provides an interface between NB 150 and external memory. To access data, the PHY provides standard CONTROL signals, base address signals, and ADDRESS signals to the external memory.

Each one of DPMs 114, 122, 134, and 142 digitally monitors activity of its respective CPU core, computes power based on the activity signals, and provides its corresponding P signals to SMU 152 to indicate an estimated power consumption. In response to the P signals, SMU 152 calculates an overall chip temperature based on the power consumption estimates. Each CPU core includes a multiple number of temperature sensors strategically placed to obtain an accurate temperature reading, and provides the corresponding T signals to SMU 152 to indicate its sensed temperature.

SMU 152 determines both the $T_{SENSE}$ signal and the $T_{CALC}$ signal. $T_{SENSE}$ is a chip temperature based on at least one on-die temperature measurement indicated by the T signals. $T_{CALC}$ is an overall chip temperature calculated from the estimated power consumption indicated by the P signals. SMU 152 determines the system temperature (namely, the ambient temperature) using both the $T_{CALC}$ signal and the $T_{SENSE}$ signal, and estimates an available boost performance based on the $T_{SENSE}$ signal, the $T_{CALC}$ signal, and the system temperature. SMU 152 can then safely boost the performance state using more of the available temperature headroom.

Figure 2:
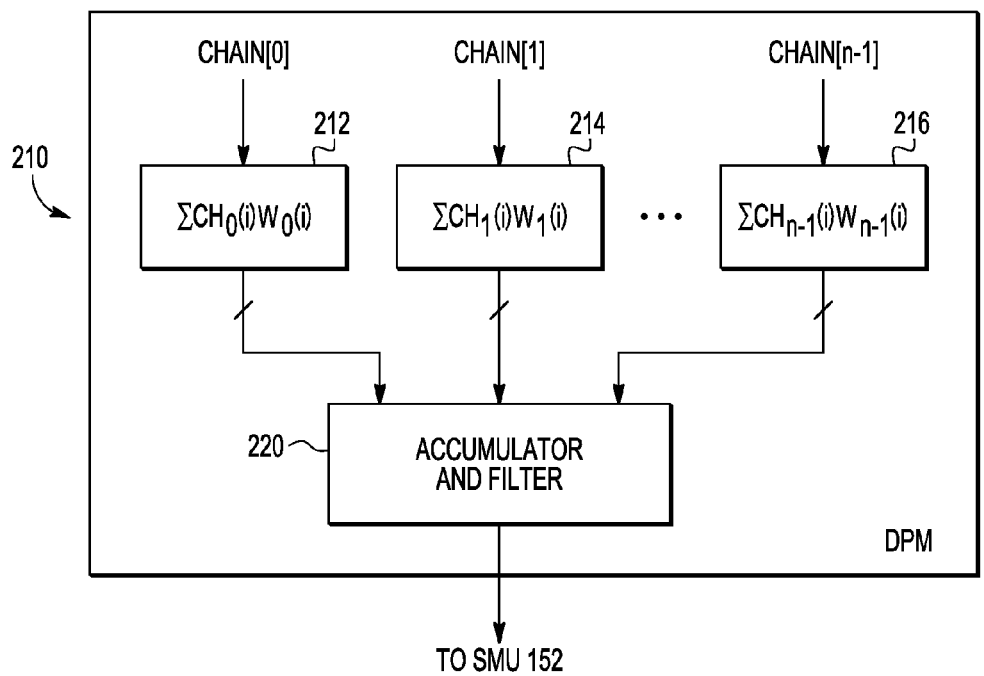
FIG. 2 illustrates in block diagram form a portion of the digital power monitor (DPM) of FIG. 1 according to some embodiments.

FIG. 2 illustrates in block diagram form a portion 200 of DPM 114 of FIG. 1 according to some embodiments. For the example shown in FIG. 2, portion 200 generally includes a multiple number of weighted summers 210 and an accumulator and filter 220.

The multiple number of summers 210 includes n weighted summers such as a representative weighted summer 212 labeled "$\Sigma CH_0(i) W_0(i)$", a representative weighted summer 214 labeled "$\Sigma CH_1(i) W_1(i)$", and a representative weighted summer 216 labeled "$\Sigma CH_{n-1}(i) W_{n-1}(i)$".

Weighted summer 212 has an input for receiving a signal labeled "CHAIN [0]", and a multi-bit output. Weighted summer 214 has an input for receiving a signal labeled "CHAIN [1]", and a multi-bit output. Weighted summer 216 has an input for receiving a representative signal labeled "CHAIN [n–1]", and a multi-bit output. Accumulator and filter 220 has inputs connected to the outputs of weighted summers 212, 214, and 216, and an output for providing the estimated power consumption to SMU 152.

In operation, each one of CPU cores 112, 118, 132, and 138 samples a comprehensive set of activity signals, for example 95 different activity signals that correlate to power consumption, over a sample period and provides these signals to a digital power monitor (DPM). Since certain functional blocks such as a floating point unit (FPU), an execution unit, and the L1 data cache consume larger power than other functional blocks, they typically provide a larger number of activity signals to their respective DPM than other circuit blocks. For the example shown in FIG. 2, the CPU cores provide activity signals serially over scan chains represented by the CHAIN [0], CHAIN [1], and CHAIN [n–1] signals to weighted summers 212, 214, and 216, respectively. Each one of the CHAIN [0], CHAIN [1], and CHAIN [n–1] signals include for example, eight activity signals that are repetitively samples and shifted.

DPM 210 assigns a weight to each one of the activity signals, and accumulates and filters the weighted activity signals to form a power estimate for the corresponding CPU core. Weighted summers 212, 214, and 216 operate in parallel, and each one of weighted summers 210 performs a multiply and add operation to apply the corresponding weight to each activity signal. Each one of the weighted summers 210 provides a partial energy count to accumulator and filter 220, which accumulates the set of signals from each one of weighted summers 210 to filter and average the weighted sum and forms an estimated power consumption to SMU 152.

SMU 152 converts the estimated power consumptions from all of the cores into $T_{CALC}$, and NB 150 uses the $T_{CALC}$ signal in power management decisions such as P-state boosting as will be described further below.

Figure 3:
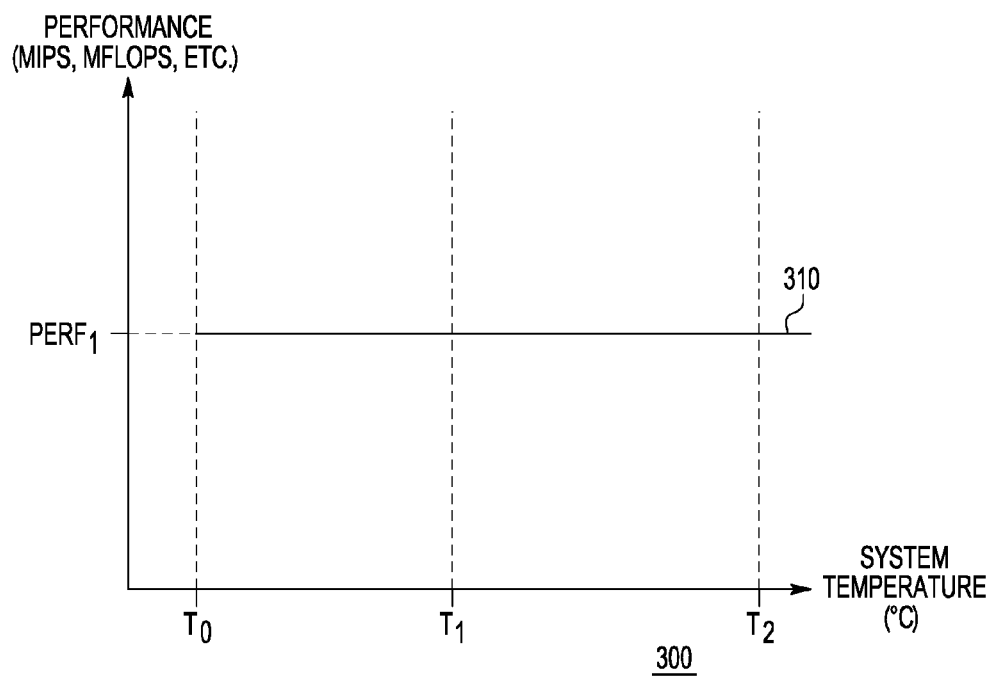
FIG. 3 illustrates a graph of available boost performance using temperature calculated from activity.

FIG. 3 illustrates a graph 300 of available boost performance using temperature calculated from activity. The horizontal axis represents a system temperature in degrees Celsius (° C.), and the vertical axis represents a boost performance (for example, the performance difference between a higher performance state and a current performance state) of at least one processor core as measured in a clock frequency, millions of instructions per second (MIPS), millions of floating point operations per second (MFLOPS), an amount of useful work performed during a certain time period, and the like. In general, a higher performance state of a processor core of integrated circuit 100 corresponds to a higher amount of power consumed by integrated circuit 100.

Graph 300 illustrates three points of interest on the horizontal axis, including a temperature labeled "$T_0$" that represents a relatively cool system temperature (for example, 20° C.), a temperature labeled "$T_1$" that represents a nominal system temperature (for example, 30°), and a temperature labeled "$T_2$" that represents a relatively high system temperature (for example, 42° C.). A temperature value on the horizontal axis represents the ambient temperature of the air flow into a heat sink of a package of integrated circuit 100. Graph 300 also illustrates a point of interest on the vertical axis is labeled "$PERF_1$".

Line 310 shown in FIG. 3 has a zero slope and a constant boost performance of $PERF_1$ that is independent of the system temperature. For the example shown in FIG. 3, line 310 is based only on the $T_{CALC}$ signal. Performance boost based on $T_{CALC}$ alone assumes a high (or so called "worst case") system temperature. Line 310 represents a constant available boost performance across a range of actual system temperatures.

Figure 4:
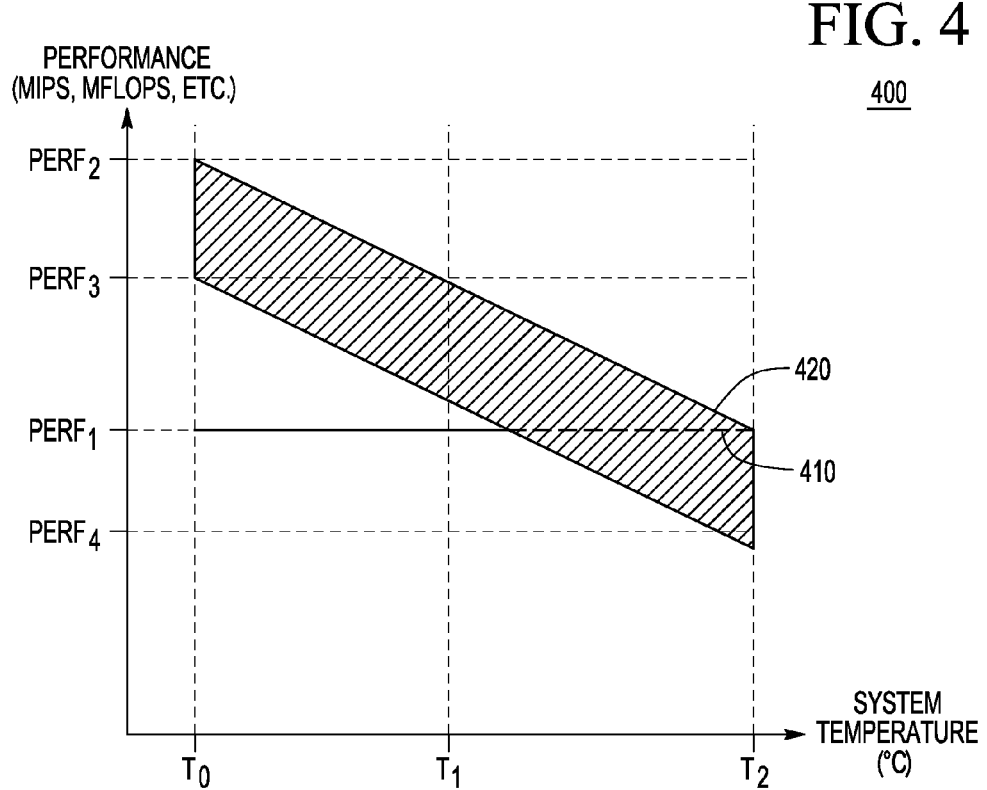
FIG. 4 illustrates a graph of available boost performance using measured temperature.

FIG. 4 illustrates a graph 400 of available boost performance using measured temperature. The horizontal axis represents a system temperature in ° C., and the vertical axis represents a boost performance of at least one processor core. Like the example shown in FIG. 3, the three points of interest on the horizontal axis are the $T_0$ point, the $T_1$ point, and the $T_2$ point. Four points of interest on the vertical axis are the $PERF_1$ point, a point labeled "$PERF_2$", a point labeled "$PERF_3$", and a point labeled "$PERF_4$".

Line 410 is approximately the same as line 310 shown in FIG. 3 and is shown for reference. Line 410 has a zero slope and has a constant boost performance of $PERF_1$ that is independent of the system temperature.

$T_{SENSE}$ is a measure of both system temperature and temperature caused by chip activity. As system temperature increases, $T_{SENSE}$ increases for a given level of activity. Region 420 is downward sloping to the right because $T_{SENSE}$ is correlated to higher system temperatures and lower available boost performance. The horizontal line at $PERF_1$ intersects the top right corner of region 420 because $T_{CALC}$ based boost performance assumes the system temperature is $T_2$. Thus $T_{SENSE}$ based boost performance allows higher performances at lower system temperature.

Region 420 also defines a region of uncertainty for SMU 152 due to the imprecision in on-die temperature sensors and chip-to-chip process variations. On-die temperature sensors may have an accuracy of only about ±5° C. If the on-die temperature sensor reads low, then SMU 152 would estimate a higher available higher boost performance than if the on-die temperature sensor read high. For example at temperature $T_0$, if the temperature sensor reads low, then the thermal headroom would be equal to $PERF_2$, whereas if the temperature sensor reads high, then the thermal headroom would be equal to $PERF_3$.

Figure 5:
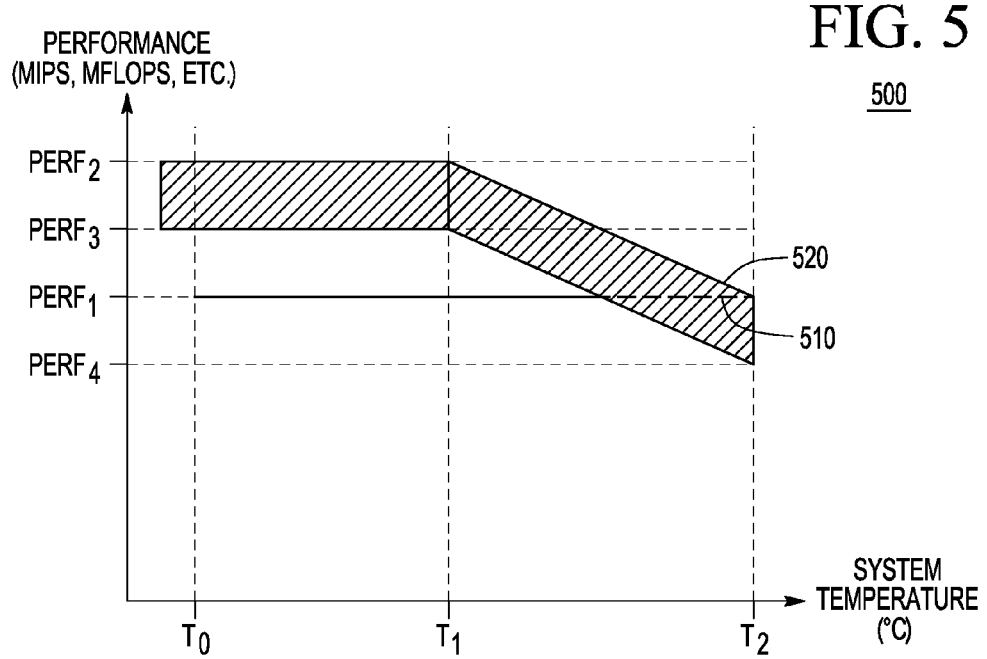
FIG. 5 illustrates a graph of available boost performance using hybrid thermal sensing according to some embodiments.

FIG. 5 illustrates a graph 500 of available boost performance using hybrid thermal sensing according to some embodiments. In FIG. 5, the horizontal axis represents a system temperature in ° C., and the vertical axis represents a boost performance of at least one processor core.

Like the examples shown in FIGS. 3 and 4, graph 500 illustrates three points of interest on the horizontal axis are the $T_0$ point, the $T_1$ point, and the $T_2$ point. Four points of interest on the vertical axis are the $PERF_1$ point, a point labeled "$PERF_2$", a point labeled "$PERF_3$", and a point labeled "$PERF_4$".

Example line 510 is approximately the same as lines 310 and 410 shown in FIGS. 3 and 4 respectively and is again shown for reference. Line 510 has a zero slope, and has a constant boost performance of $PERF_1$ that is independent on the system temperature. Region 520 represents a range of boost performance levels based on the variability of thermal sensors present in the $T_{SENSE}$ signal.

Since SMU 152 uses hybrid thermal sensing, it can estimate the actual system temperature based on the difference between $T_{SENSE}$ and $T_{CALC}$, namely:

$$\text{System temperature} = T_{SENSE} - T_{CALC} \quad [1]$$

SMU 152 determines the available boost performance based on the system temperature. For example if the system temperature is relatively cool between $T_0$ and $T_1$, SMU 152 calculates available boost performance as in graph 300 as either $PERF_2$ (if $T_{SENSE}$ reads low) or $PERF_3$ (if $T_{SENSE}$ reads high). If the system temperature is relatively hot between $T_1$ and $T_2$, SMU 152 calculates an available boost performance that varies inversely with system temperature as shown in graph 400. When the system temperature rises above $T_2$, SMU 152 disables further boosting and uses other mechanisms such as hardware thermal control (HTC) to reduce the maximum available performance state, and eventually thermal shutdown to avoid damaging the integrated circuit.

By using hybrid thermal sensing based on a system temperature derived from both measured temperature and chip power consumption, SMU 152 can safely boost a performance state of a processor core based on both the $T_{SENSE}$ and $T_{CALC}$ signals and use more of the available temperature headroom than either $T_{CALC}$ based boosting or $T_{SENSE}$ based boosting as shown in FIGS. 3 and 4.

Region 520 defines a tighter range of boost performance than region 420 of FIG. 2 by using more accurate on-die temperature measurement. The improved accuracy is obtained using techniques that will now be described.

Figure 6:
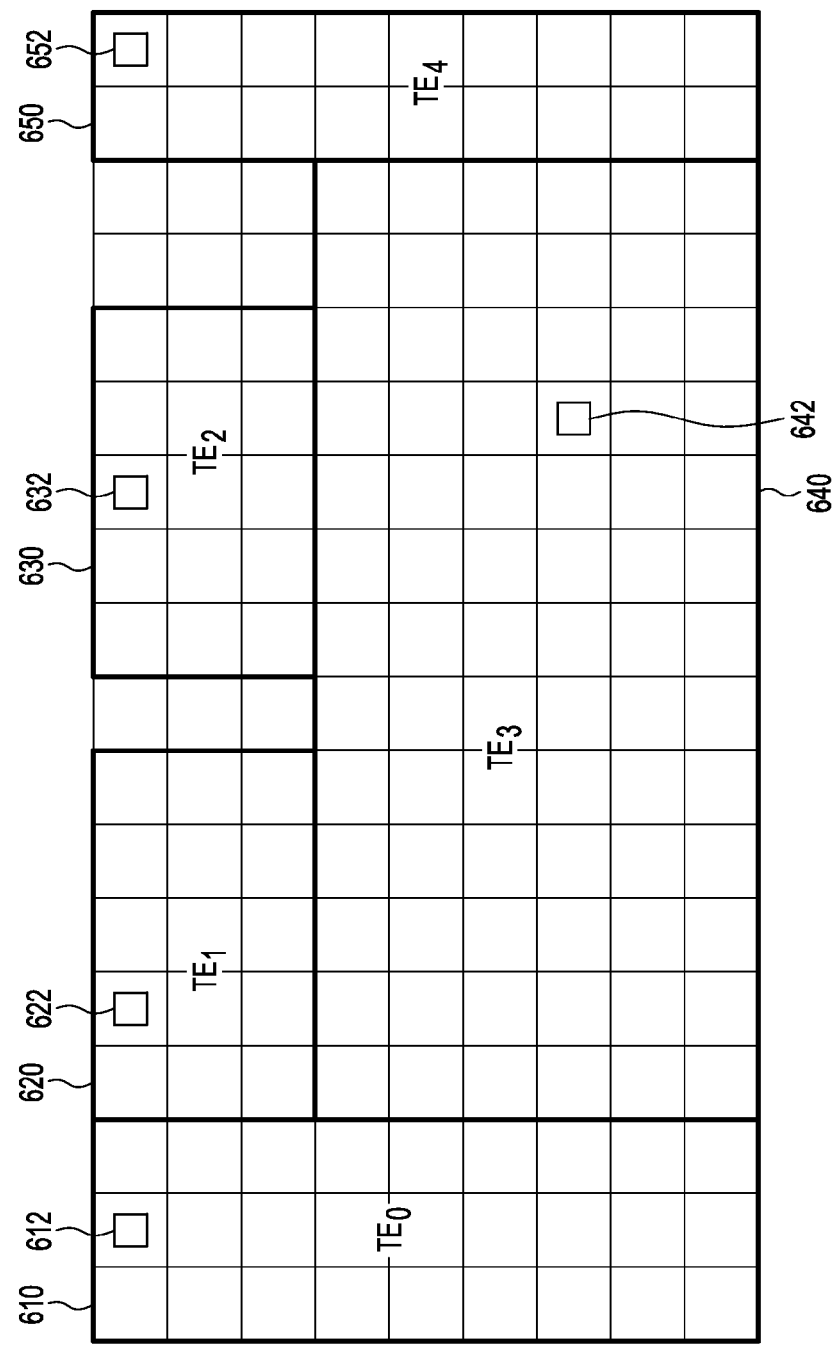
FIG. 6 illustrates in block diagram form a portion of the integrated circuit of FIG. 1 that includes a multiple number of thermal entities according to some embodiments.

FIG. 6 illustrates in block diagram form a representation 600 of integrated circuit 100 of FIG. 1 that includes a multiple number of thermal entities according to some embodiments. For the example shown in FIG. 6, representation 600 generally includes a thermal entity 610 labeled "$TE_0$", a thermal entity 620 labeled "$TE_1$", a thermal entity 630 labeled "$TE_2$", a thermal entity 640 labeled "$TE_3$", and a thermal entity 650 labeled "$TE_4$". Each one of thermal entities 610, 620, 630, 640, and 650 includes at least one temperature sensor, for example, temperature sensors 612, 622, 632, 642, and 652, respectively.

Representation 600 is partitioned into multiple thermal entities, where, for example, thermal entity 610 includes the L1 cache, thermal entity 620 includes processor core module 110, thermal entity 630 includes processor core module 130, and thermal entities 630, 640, and 650 include other logic functions of integrated circuit 100 such as GPU core 160. The thermal entities correspond to a multiple number of temperature sensors such as temperature sensors 614, 624, 634, 644, and 654 that are distributed for example, across the processor cores. For the example illustrated in FIG. 6, each thermal entity corresponds to a single temperature sensor and other temperature sensors are not shown. In some embodiments, each thermal entity, or a multiple number of thermal entities could correspond to a multiple number of temperature sensors, and integrated circuit 100 could include temperature sensors in other areas of integrated circuit 100.

Figure 7:
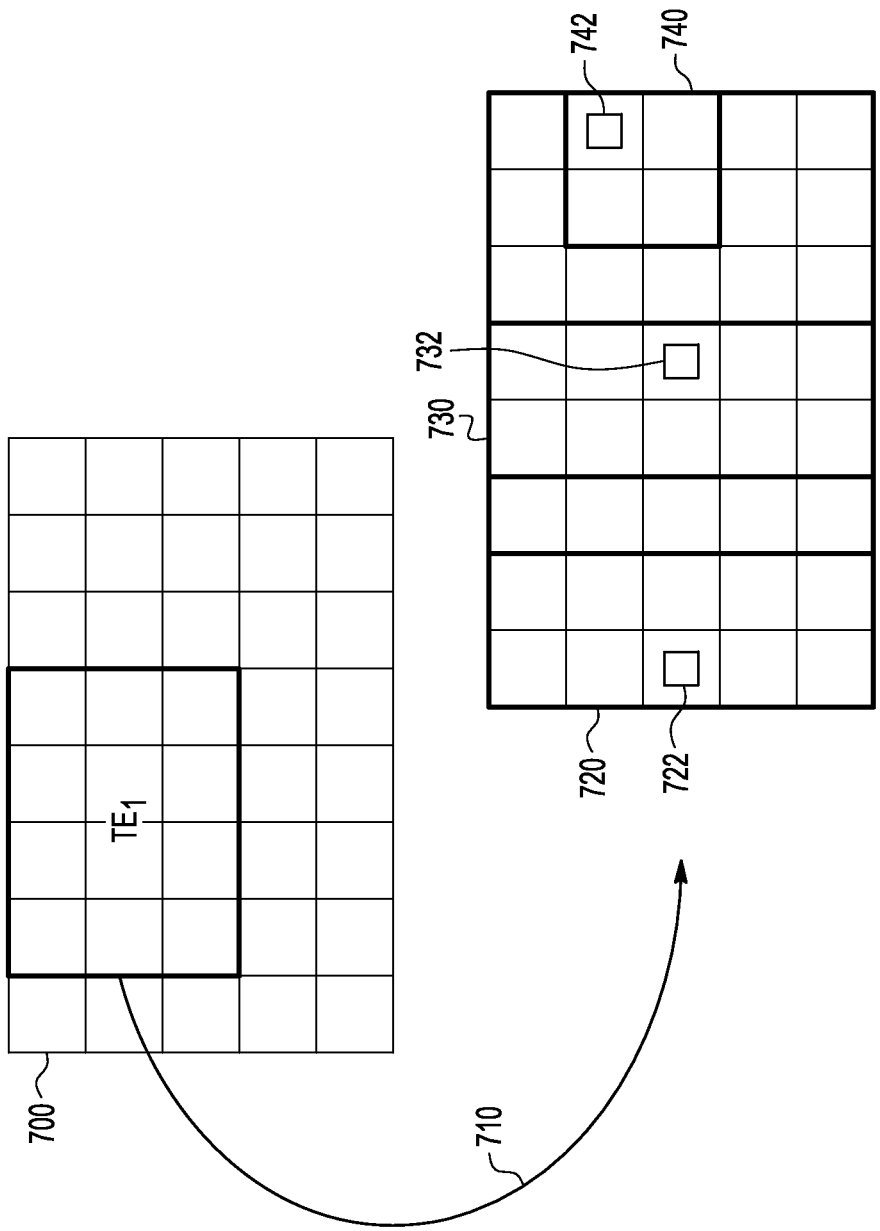
FIG. 7 illustrates in block diagram form a portion of the integrated circuit of FIG. 1 having a thermal entity that includes a multiple number of sub-thermal entities according to some embodiments.

FIG. 7 illustrates in block diagram form a portion 700 of integrated circuit 100 of FIG. 1 having a thermal entity 710 labeled "$TE_1$" that includes a multiple number of sub-thermal entities according to some embodiments. For the example shown in FIG. 7, thermal entity 710 generally includes sub-thermal entities 720, 730, and 740. Each one of sub-thermal entities 720, 730, and 740 includes at least one temperature sensor, for example, temperature sensors 722, 732, and 742, respectively.

Thermal entity 710 has a multiple number of "finer grained" sub-thermal entities 720, 730, and 740. Each one of the sub-thermal entities corresponds to (i.e. surrounds) a multiple number of temperature sensors such as temperature sensors 724, 734, and 744 that are distributed for example, across the processor cores.

By including a multiple number of finer grain sub-thermal entities corresponding to a multiple number or temperature sensors, SMU 152 accurately derives a system temperature based on the relationship derived in equation [1].

Figure 8:
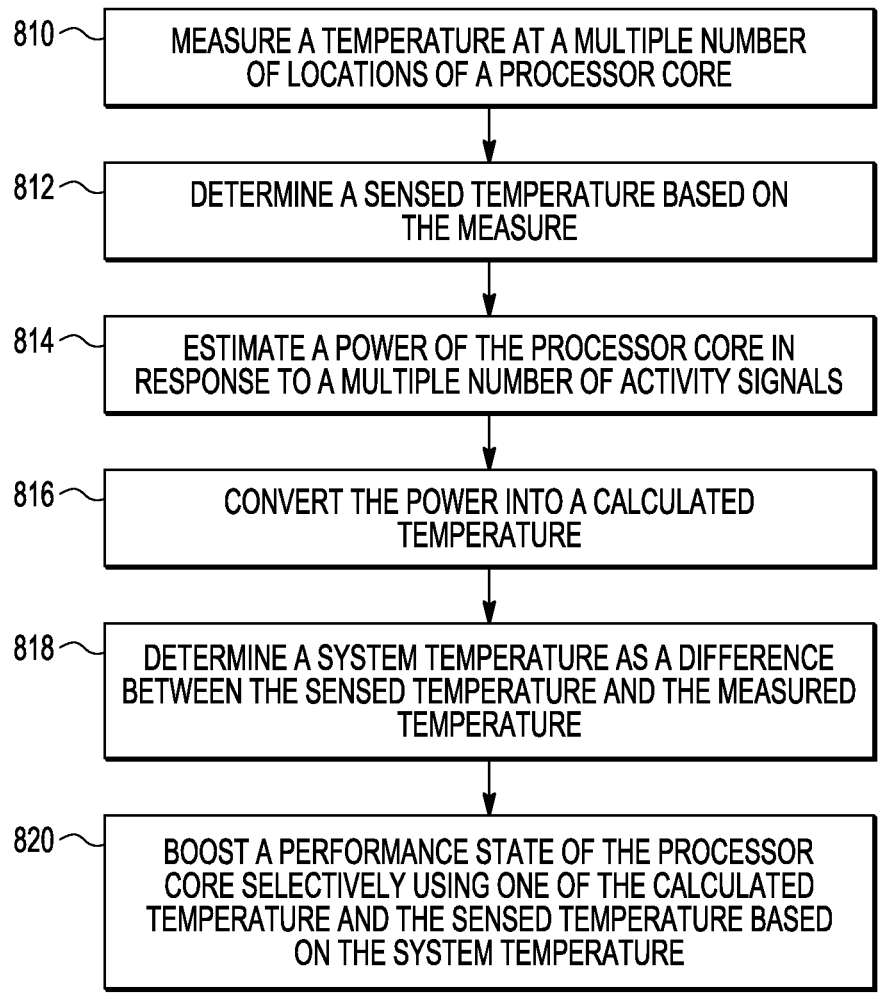
FIG. 8 illustrates a flow diagram of a method for selectively boosting a performance state of a processor core for the integrated circuit of FIG. 1 according to some embodiments.

FIG. 8 illustrates a flow diagram of a method 800 for selectively boosting a performance state of a processor core 110 for integrated circuit 100 of FIG. 1 according to some embodiments. Action box 810 includes measuring a temperature at a multiple number of locations of a processor core. In some embodiments, measuring the temperature is based on a multiple number of thermal entities corresponding to the multiple number of locations.

Action box 812 includes determining a sensed temperature based on the measure. Action box 814 includes estimating a power of the processor core in response to a multiple number of activity signals. In some embodiments, estimating a power of the processor core includes summing a group of weighted activity signals to provide an energy count over a sample period.

Action box 816 includes converting the power into a calculated temperature. Action box 818 includes determining a system temperature as a difference between the sensed temperature and the measured temperature. Action box 820 includes boosting a performance state of the processor core selectively using one of the calculated temperature and the sensed temperature based on the system temperature.

Thus, an integrated circuit described in some embodiments herein advantageously takes advantage of available temperature headroom that enables the processor cores to perform at higher performance states. The integrated circuit includes a multiple number of processing cores and an SMU. The multiple number of processor cores each operate at one of a multiple number of performance states. The system management unit sets performance states of the multiple number of processor cores. The system management unit also boosts a first performance state of a first processor core of the multiple number of processor cores based on both a first temperature calculated from an estimated power consumption, and a second temperature based on a temperature measurement. The SMU as described herein can determine a calculated temperature in response to an estimated power consumption, and also responds to a calculated temperature and a sensed temperature of each of the multiple number of processor cores, and determines a system temperature. The system management unit boosts a first performance state of a first processor core of the multiple number of processor cores based on both a first temperature calculated from an estimated power consumption, and a second temperature based on a temperature measurement.

The functions of integrated circuit 100, portion 200, representation 600, and portion 700 of FIGS. 1, 2, 6, and 7 may be implemented with various combinations of hardware and software. For example, some functions of the multiple number of processor cores 110 and 130, and SMU 152 may be determined by a basic input-output system (BIOS), an operating system, firmware, or software drivers, and stored as a table in non-volatile memory. Some of the software components may be stored in a computer readable storage medium for execution by at least one processor. Moreover the method illustrated in FIG. 8 may also be governed by instructions that are stored in a computer readable storage medium and that are executed by at least one processor. Each of the operations shown in FIG. 8 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of FIGS. 1, 2, 6, and 7 may be described or represented by a computer accessible data structure in the form of a database or other data structure which can be read by a program and used, directly or indirectly, to fabricate integrated circuits with the circuits of FIGS. 1, 2, 6, and 7. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIGS. 1, 2, 6, and 7. The netlist may then be placed and routed to produce a data set describing geometric shapes to be applied to masks. The masks may then be used in various semiconductor fabrication steps to produce integrated circuits of FIGS. 1, 2, 6, and 7. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiments, integrated circuit 100 includes processor cores that are represented by four CPU cores 112, 118, 132 and 138 and one GPU core 160. In some embodiments, integrated circuit 100 could include a different number of CPU cores and/or GPU cores. CPU cores 112, 118, 132 and 138 and GPU core 160 could be other types of data processor cores than CPU cores or GPU cores, such as digital signal processor (DSP) cores, a video processing core, a multi-media core, a display engine, a rendering engine, and the like. CPU cores 112, 118, 132 and 138, GPU core 160, NB 150 and SMU 152 could use a common circuit design or different circuit designs. Also, CPU cores 112, 118, 132 and 138, GPU core 160, NB 150 and SMU 152 could be formed on a single integrated circuit or could be formed on multiple integrated circuits.

Any combination of CPU cores 112, 118, 132 and 138, GPU core 160, NB 150 and SMU 152, respectively, could be integrated on a single semiconductor chip, or any combination of CPU cores 112, 118, 132 and 138, GPU core 160, NB 150 and SMU 152, respectively, could be on separate chips.

In the illustrated embodiment of FIG. 1, CPU cores 112, 118, 132, and 138, include corresponding DPMs 114, 122, 134, and 142. In some embodiments, GPU core 160 could also include a DPM (not shown), and GPU core 160 could operate at one of a multiple number of performance states. Also, SMU 152 could set performance states of GPU core 160, and could boost a first performance state of GPU 160 based on both a first temperature calculated from an estimated power consumption, and a second temperature based on a temperature measurement.

Accordingly, it is intended by the appended claims to cover all modifications of the disclosed embodiments that fall within the scope of the disclosed embodiments.

What is claimed is:

1. An integrated circuit comprising:
    a plurality of processor cores, each operating at one of a plurality of performance states;
    a system management unit (SMU) circuit coupled to said plurality of processor cores, for setting performance states of said plurality of processor cores, and boosting a first performance state of a first processor core of said plurality of processor cores based on both a first temperature calculated from an estimated power consumption, and a second temperature based on a temperature measurement, if a system temperature, estimated as a difference between said second temperature and said first temperature, is below a predetermined temperature; and
    a digital power monitor responsive to a plurality of activity signals to provide said estimated power consumption.

2. The integrated circuit of claim 1, wherein said predetermined temperature is a nominal system temperature.

3. The integrated circuit of claim 1, wherein each of said plurality of processor cores comprises a respective digital power monitor responsive to said plurality of activity signals to provide said respective estimated power consumption.

4. The integrated circuit of claim 3, wherein said SMU circuit forms said estimated power consumption based on said respective estimated power consumption of each of said plurality of processor cores.

5. The integrated circuit of claim 3, wherein each respective digital power monitor comprises:
    a plurality of summers, each summer for summing a group of weighted activity signals to provide a partial energy count over a sample period.

6. The integrated circuit of claim 5, wherein each respective digital power monitor further comprises:
    an accumulator and filter for averaging said partial energy counts to provide said estimated power consumption.

7. The integrated circuit of claim 1, wherein said first processor core comprises a plurality of temperature sensors distributed across said first processor core, and said SMU circuit determines said second temperature based on temperature measurements from said plurality of temperature sensors.

8. The integrated circuit of claim 7, wherein said first processor core comprises a plurality of thermal entities corresponding to said plurality of temperature sensors.

9. The integrated circuit of claim 1, wherein said plurality of processor cores comprise at least one central processing unit core and at least one graphics processing unit core.

10. An integrated circuit comprising:
    a plurality of processor cores, each operating at one of a plurality of performance states, and having a first output for providing an estimated power consumption, and a second output for providing at least one sensed temperature; and
    a system management unit (SMU) circuit coupled to said plurality of processor cores, for determining a calculated temperature in response to said estimated power consumption, and responsive to said calculated temperature and said sensed temperature of each of said plurality of processor cores to determine a system temperature, and to boost a first performance state of a first processor core of said plurality of processor cores based on said calculated temperature when said system temperature is below a predetermined level, and based on said sensed temperature when said system temperature is above said predetermined level.

11. The integrated circuit of claim 10, wherein said predetermined level is a nominal system temperature.

12. The integrated circuit of claim 10, wherein each of said plurality of processor cores comprises a plurality of temperature sensors, and said sensed temperature comprises outputs from said plurality of temperature sensors.

13. The integrated circuit of claim 10, wherein each of said plurality of processor cores comprises a respective digital power monitor responsive to a plurality of activity signals to provide said estimated power consumption of a corresponding one of said plurality of processor cores based on said plurality of activity signals.

14. The integrated circuit of claim 13, wherein each respective digital power monitor comprises:
    a plurality of summers, each summer for summing a group of weighted activity signals to provide a partial energy count over a sample period.

15. The integrated circuit of claim 14, wherein each respective digital power monitor further comprises:
    an accumulator and filter for averaging said partial energy counts to provide said estimated power consumption.

16. The integrated circuit of claim 10, wherein said SMU circuit converts said estimated power consumption into a calculated temperature.

17. The integrated circuit of claim 10, wherein each of said plurality of processor cores comprises a plurality of thermal entities corresponding to a plurality of temperature sensors.

18. A method comprising:
    measuring a temperature at a plurality of locations of a processor core;
    determining a sensed temperature based on said measuring;
    estimating a power of said processor core in response to a plurality of activity signals;
    converting said power into a calculated temperature;
    determining a system temperature as a difference between said sensed temperature and said measured temperature; and
    boosting a performance state of said processor core selectively using one of said calculated temperature and said sensed temperature based on said system temperature.

19. The method of claim 18, wherein said estimating a power of said processor core comprises:
    summing a group of weighted activity signals to provide an energy count over a sample period.

20. The method of claim 18, wherein said measuring said temperature is based on a plurality of thermal entities corresponding to said plurality of locations.

\* \* \* \* \*